(12) United States Patent
Brown et al.

(10) Patent No.: US 11,820,111 B2
(45) Date of Patent: Nov. 21, 2023

(54) TILE CONTAINING PRIMER COATED SUBSTRATES WITH GOOD ADHESION

(71) Applicant: Dow Global Technologies LLC, Midland, MI (US)

(72) Inventors: Susan G. Brown, Lake Jackson, TX (US); Qichun Wan, Midland, MI (US); Ronald J. Weeks, Lake Jackson, TX (US); Mark T. Jablonka, Lake Jackson, TX (US); Rennisha R. Wickham, Lake Jackson, TX (US); Colin LiPiShan, Lake Jackson, TX (US); Miguel Alberto de Jesus Prieto, Richterswil (CH)

(73) Assignee: Dow Global Technologies LLC, Midland, MI (US)

( * ) Notice: Subject to any disclaimer, the term of this patent is extended or adjusted under 35 U.S.C. 154(b) by 737 days.

(21) Appl. No.: 16/758,328

(22) PCT Filed: Oct. 23, 2018

(86) PCT No.: PCT/US2018/056990
§ 371 (c)(1),
(2) Date: Apr. 22, 2020

(87) PCT Pub. No.: WO2019/083925
PCT Pub. Date: May 2, 2019

(65) Prior Publication Data
US 2020/0316924 A1 Oct. 8, 2020

Related U.S. Application Data

(60) Provisional application No. 62/576,963, filed on Oct. 25, 2017.

(51) Int. Cl.
*B32B 27/08* (2006.01)
*B32B 7/12* (2006.01)
(Continued)

(52) U.S. Cl.
CPC ............ *B32B 27/08* (2013.01); *B32B 7/12* (2013.01); *B32B 27/308* (2013.01); *B32B 27/32* (2013.01);
(Continued)

(58) Field of Classification Search
CPC ......... B32B 27/08; B32B 7/12; B32B 27/308; B32B 27/32; B32B 27/40; B32B 2255/10;
(Continued)

(56) References Cited

U.S. PATENT DOCUMENTS 4,058,647 A 11/1977 Inoue et al.
4,371,662 A * 2/1983 Tone .................... C09D 153/00
525/89

(Continued)

FOREIGN PATENT DOCUMENTS

EP 0873242 B1 2/2002
EP 2191961 A2 6/2010

*Primary Examiner* — Kevin R Kruer
(74) *Attorney, Agent, or Firm* — Boyle Fredrickson, S.C.

(57) ABSTRACT

A tile comprising the following components: A) a first film formed from a first composition comprising the following: i) a functionalized olefin-based polymer comprising one or more chemical groups selected from the following: a) a carboxylic acid, and/or b) an anhydride, and, optionally, c) an amino or an amine; and ii) a functionalized styrenic block copolymer, comprising, in polymerized form, styrene, and ethylene and/or at least one alpha-olefin, and comprising one or more chemical groups selected from the following: a) a carboxylic acid, and/or b) an anhydride; and B) a substrate comprising at least one layer formed from a second composition comprising a propylene-based polymer; and wherein the first film covers at least one surface of the substrate.

8 Claims, 1 Drawing Sheet

FIGURE 1

(51) Int. Cl.
*B32B 27/30* (2006.01)
*B32B 27/32* (2006.01)
*B32B 27/40* (2006.01)
*C08F 22/06* (2006.01)
*C09D 5/00* (2006.01)
*C09D 123/08* (2006.01)
*C09D 123/26* (2006.01)
*C09D 125/08* (2006.01)
*C09D 153/00* (2006.01)
*C09J 151/06* (2006.01)
*C09J 153/00* (2006.01)

(52) U.S. Cl.
CPC .............. *B32B 27/40* (2013.01); *C08F 22/06* (2013.01); *C09D 5/002* (2013.01); *C09D 123/0815* (2013.01); *C09D 123/26* (2013.01); *C09D 125/08* (2013.01); *C09D 153/005* (2013.01); *C09J 151/06* (2013.01); *C09J 153/005* (2013.01); *B32B 2255/10* (2013.01); *B32B 2255/26* (2013.01); *B32B 2310/0831* (2013.01); *B32B 2323/04* (2013.01); *B32B 2323/10* (2013.01); *B32B 2325/00* (2013.01); *B32B 2333/08* (2013.01); *B32B 2375/00* (2013.01); *B32B 2471/00* (2013.01)

(58) Field of Classification Search
CPC ........ B32B 2255/26; B32B 2310/0831; B32B 2323/04; B32B 2323/10; B32B 2325/00; B32B 2333/08; B32B 2375/00; B32B 2471/00; B32B 2255/24; C08F 22/06; C09D 5/002; C09D 123/0815; C09D 123/26; C09D 125/08; C09D 153/005; C09J 151/06; C09J 153/005; C09J 175/14
See application file for complete search history.

(56) References Cited

U.S. PATENT DOCUMENTS

| | | | | |
|---|---|---|---|---|
| 4,588,648 A | | 5/1986 | Krueger et al. | |
| 4,851,476 A | * | 7/1989 | Willis | C08F 8/00 525/154 |
| 4,861,676 A | * | 8/1989 | Lee | C08L 25/06 525/74 |
| 5,011,720 A | * | 4/1991 | Jabarin | B32B 7/04 428/474.9 |
| 5,053,457 A | * | 10/1991 | Lee | C09J 151/06 525/207 |
| 5,118,761 A | * | 6/1992 | Dharmarajan | C08L 23/16 525/207 |
| 5,183,857 A | * | 2/1993 | Shiraki | C08F 287/00 525/296 |
| 5,409,991 A | * | 4/1995 | Mitsuno | C08L 77/00 524/505 |
| 5,726,215 A | * | 3/1998 | Yoshimi | C08L 23/02 521/142 |
| 6,184,298 B1 | * | 2/2001 | Lee | B32B 7/12 428/476.3 |
| 6,310,134 B1 | * | 10/2001 | Templeton | C09D 151/06 524/549 |
| 6,313,252 B1 | * | 11/2001 | Drumright | C08F 8/24 525/379 |
| 6,914,097 B2 | * | 7/2005 | Ward | C09J 129/04 525/327.4 |
| 7,459,503 B2 | * | 12/2008 | Kanamaru | C09J 123/10 525/263 |
| 7,812,085 B2 | * | 10/2010 | Tse | C09J 151/06 524/515 |
| 2002/0016381 A1 | * | 2/2002 | Kroll | A61L 15/585 522/109 |
| 2003/0207984 A1 | * | 11/2003 | Ding | B32B 27/32 524/570 |
| 2005/0106965 A1 | | 5/2005 | Wevers et al. | |
| 2005/0222327 A1 | * | 10/2005 | Botros | C08L 51/06 525/70 |
| 2006/0025526 A1 | * | 2/2006 | Botros | C08L 23/10 525/240 |
| 2008/0029743 A1 | * | 2/2008 | Yasumoto | C08L 23/10 252/601 |
| 2008/0039583 A1 | * | 2/2008 | Lee | C08F 255/02 525/71 |
| 2008/0254308 A1 | * | 10/2008 | Thomasson | B32B 7/12 264/642 |
| 2008/0311332 A1 | | 12/2008 | Sakurai et al. | |
| 2010/0143651 A1 | | 6/2010 | Silvis et al. | |
| 2013/0108827 A1 | * | 5/2013 | Okada | C08F 255/04 523/436 |
| 2017/0144416 A1 | * | 5/2017 | Broadus | B32B 27/325 |
| 2018/0187040 A1 | | 7/2018 | Wan et al. | |
| 2018/0194919 A1 | | 7/2018 | Wu et al. | |
| 2020/0255643 A1 | * | 8/2020 | Wang | B01J 8/008 |

* cited by examiner

TILE CONTAINING PRIMER COATED SUBSTRATES WITH GOOD ADHESION

FIELD OF INVENTION

Embodiments of this invention relate to a composition composed of a functionalized olefin-based polymer and a functionalized styrenic block copolymer, articles comprising at least one component formed from the composition, and methods of producing the composition and articles.

BACKGROUND OF THE INVENTION

Luxury vinyl tile (LVT) is a fast growing segment in the flooring market. These tiles and planks are typically composed of a highly filled base layer situated beneath a decorative film covered by a clear wear layer, which is covered by a top coat layer. When multiple coatings are used, the integrity of the coating system can depend on the adhesion between adjoining coatings. It is therefore desirable that the multiple coatings exhibit excellent adhesion to adjoining coatings.

The most common polymer used in LVT wear layers is plasticized polyvinyl chloride (P-PVC). However, growing environmental concerns centered on plasticizer emissions (both during manufacture and end-use) and the recyclability and reprocessing issues of P-PVC have urged manufacturers to look for replacement materials for P-PVC. Another environmental issue with PVC LVTs is that when the material burns, hazardous halogen-containing products of combustion, such as hydrogen chloride, can be formed.

Polypropylene (e.g., random copolymer polypropylene, RCP) has been used as wear layers in the luxury vinyl tile (LVT) industry. RCP provides decent scratch/abrasion resistance, good clarity and flexibility. Many flooring applications use acrylic urethane coatings as a top coat due to their versatility, durability, appearance and superior weatherability compared to other resin systems. However, adhesion between a propylene-based material layer and urethane/acrylic coatings is problematic.

Conventional methods to improve the adhesion of polyolefins include bulk modification by blending with polar polymers and surface modification by means of physical and chemical treatments. Such treatments include some simple means such as solvent clean-up (or wiping), surface roughening by sand paper, acid treatment and base treatment, to some more sophisticated treatments such as plasma, corona and flame treatments. Some of these treatments lengthen processing time and require a more complicated processing method.

Conventional methods also include adhesive compositions including an organic solvent and a functionalized polyolefin, but a need remains for an adhesive composition with further improved adhesion. Functionalized and non-functionalized styrenic block copolymers have been used in hot melt adhesives and as primers for rubbers. However, they generally do not exhibit sufficient adhesion with polyethylene- or polypropylene-containing polyolefins, when compared to functionalized polyolefins.

It would, therefore, be desirable to provide a primer material that can be used as an adhesive layer in Luxury Polyolefin Tile (LPT) resilient flooring coverings and which will exhibit sufficient adhesion with a propylene-containing polyolefin wear layer and a urethane-acrylic top coat layer. These needs and others have been met by the following invention.

SUMMARY OF THE INVENTION

In embodiments, the invention provides a tile comprising the following components:
A) a first film formed from a first composition (primer composition) comprising the following;
i) a functionalized olefin-based polymer comprising one or more chemical groups selected from the following: a) a carboxylic acid, and/or b) an anhydride, and, optionally, c) an amino or an amine; and
ii) a functionalized styrenic block copolymer, comprising, in polymerized form, styrene, and ethylene and/or at least one alpha-olefin, and comprising one or more chemical groups selected from the following: a) a carboxylic acid, and/or b) an anhydride; and
B) a substrate comprising at least one layer formed from a second composition comprising a propylene-based polymer;
wherein the first film covers at least one surface of the substrate.

DETAILED DESCRIPTION OF THE INVENTION

Figure 1:
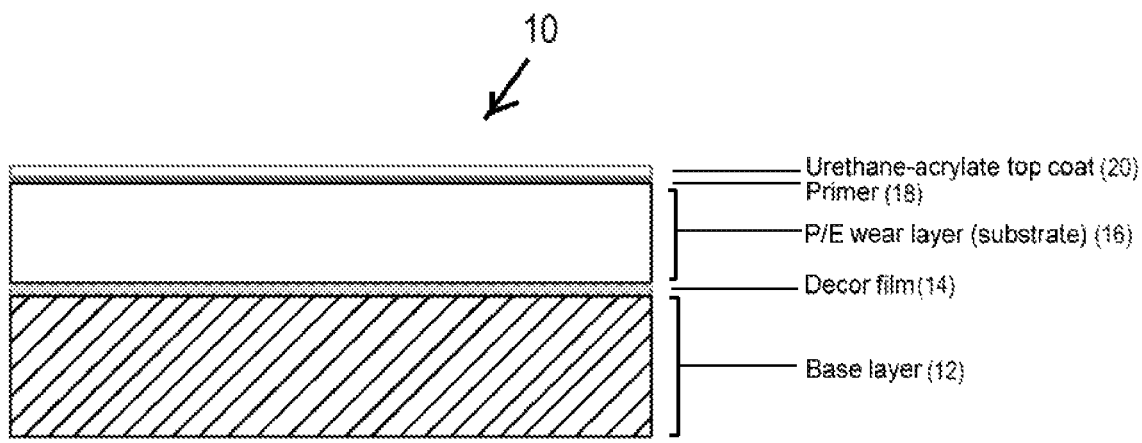
FIG. 1 depicts an embodiment of a multilayer tile.

Various embodiments of the present invention relate to a composition comprising a functionalized olefin-based polymer and a functionalized styrenic block copolymer, and to crosslinked compositions. Embodiments of the invention further relate to articles of manufacture employing such polymer compositions, and methods for preparing the polymer compositions and articles. In embodiments, the composition can be used as a primer layer in a polyolefin tile or other substrate or article. It was surprisingly found that the present composition provides a high level of adhesiveness between a propylene-based polymer material and a urethane-acrylic material. The adhesive composition is particularly useful as a primer layer to form an improved adhesive layer between a propylene-based wear layer and a urethane-acrylic top coat layer for use in Luxury Polyolefin Tiles (LPT).

In an embodiment, the invention provides a tile comprising the following components:
A) a first film formed from a first composition comprising the following;
i) a functionalized olefin-based polymer comprising one or more chemical groups selected from the following: a) a carboxylic acid, and/or b) an anhydride, and, optionally, c) an amino or an amine; and
ii) a functionalized styrenic block copolymer, comprising, in polymerized form, styrene, and ethylene and/or at least one alpha-olefin, and comprising one or more chemical groups selected from the following: a) a carboxylic acid, and/or b) an anhydride; and
B) a substrate comprising at least one layer formed from a second composition comprising a propylene-based polymer; and
wherein the first film covers at least one surface of the substrate.

In an embodiment, the first composition is a primer composition.

In an embodiment, the first composition comprises less than 0.001 wt % of an isocyanate compound. In an embodiment, the first composition comprises from 0 to less than 0.01 wt %, and further from 0 to less than 0.001 wt % of an isocyanate compound (a chemical compound that contains one or more isocyanate groups), based on the weight of the composition. In an embodiment, the composition does not comprise an isocyanate compound.

In an embodiment, the first composition is halogen (e.g., chlorine) free.

In an embodiment, the functionalized olefin-based polymer is a functionalized ethylene-based polymer. In an embodiment, the functionalized olefin-based polymer is a functionalized ethylene/α-olefin interpolymer selected from the group consisting of the following: a carboxylic-acid-functionalized ethylene/α-olefin copolymer, an anhydride-functionalized ethylene/α-olefin interpolymer, a hydroxy-functionalized ethylene/α-olefin interpolymer, an amine-functionalized ethylene/α-olefin interpolymer, and a combination thereof. In an embodiment, the functionalized olefin-based polymer is a maleic anhydride (MAH) functionalized ethylene-based polymer. In a further embodiment, the functionalized ethylene-based polymer is a maleic anhydride (MAH) grafted ethylene-based polymer.

In an embodiment, the functionalized styrenic block copolymer comprises from 20 to 60 wt %, or from 20 to 50 wt %, or from 25 to 40 wt %, or from 25 to 35 wt % polymerized styrene. In an embodiment, the functionalized styrenic block copolymer is selected from the group consisting of the following: a carboxylic-acid-functionalized styrenic block copolymer, an anhydride-functionalized styrenic block copolymer, a hydroxy-functionalized styrenic block copolymer, an amine-functionalized styrenic block copolymer, and a combination thereof. In an embodiment, the functionalized styrenic block copolymer ii) is a maleic anhydride (MAH) functionalized (or grafted) styrenic block copolymer. In a further embodiment, the maleic anhydride (MAH) functionalized styrenic block copolymer is a maleic anhydride (MAH) grafted styrenic block copolymer.

In an embodiment, the functionalized styrenic block copolymer comprises from 20 to 60 wt % polymerized styrene, based on the weight of the copolymer. In an embodiment, the functionalized styrenic block copolymer is a maleic-anhydride-functionalized styrenic block copolymer comprising from 20 to 60 wt % polymerized styrene, and the functionalized olefin-based polymer (e.g., ethylene/α-olefin interpolymer) is a maleic-anhydride-functionalized ethylene/octene copolymer.

In an embodiment, the weight ratio of the functionalized olefin-based polymer to the functionalized styrenic block copolymer is from 95/5 to 10/90. In an embodiment, the weight ratio of the functionalized olefin-based polymer to the functionalized styrenic block copolymer is from 2.0/1.0 to 6.0/1.0, and further from 3.0/1.0 to 5.0/1.0.

In an embodiment, the density ratio of the functionalized olefin-based polymer to the functionalized styrenic block copolymer is from 0.93 to 0.99, or from 0.94 to 0.98, or from 0.95 to 0.97.

In an embodiment, the first composition further comprises iii) a solvent composition comprising at least one hydrocarbon solvent. In an embodiment, the hydrocarbon solvent is an aliphatic hydrocarbon solvent. In an embodiment, the solvent composition optionally includes a polar solvent. In an embodiment, the solvent composition comprises a ketone or an alcohol. In an embodiment, the solvent further comprises 0.5 wt % to 20 wt % of a polar solvent, based on the total weight of the solvent composition. In an embodiment, the solvent composition comprises a ketone. In an embodiment, the solvent composition comprises a hydrocarbon solvent and a ketone in a weight ratio of 99.5/0.5 to 80/20.

In an embodiment, the first composition comprises a total solids content ranging from 1 to 20 wt %, or from 2 to 15 wt %, or from 5 to 10 wt %, based on the weight of the composition.

In an embodiment, the first composition has a Brookfield Viscosity of 1000 to 5000 cP at 23° C.

In an embodiment, the substrate (e.g., wear layer) has a thickness of from 20 to 100%, or from 30 to 80%, or from 40 to 60%, of a total thickness of the tile. In an embodiment, the substrate has a total thickness of from 0.1 to 5.0 mm, or from 0.2 to 2.0 mm, or from 0.3 to 1.0 mm, or from 0.4 to 0.80 mm.

In an embodiment, the substrate is a wear layer comprising the at least one layer formed from the second composition comprising a propylene-based polymer.

In an embodiment, the tile further comprises C) a top coat layer applied onto and in contact with the first film A). In an embodiment, the top coat layer comprises a UV-curable urethane-acrylate polymer.

In an embodiment, the substrate is a wear layer, the first film is a primer layer overlying and adhered to the wear layer, and the tile further comprises a top coat layer overlying and adhered to the first film layer.

In an embodiment, the invention provides a tile as described herein.

In an embodiment, the invention provides a primer composition comprising the following components:
A) a functionalized olefin-based polymer comprising one or more chemical groups selected from i) a carboxylic acid, and/or ii) an anhydride; and, optionally, an amino or an amine; and
B) a functionalized styrenic block copolymer comprising, in polymerized form, styrene, and ethylene and/or at least one alpha-olefin, and comprising one or more chemical groups selected from the following: i) a carboxylic acid, and/or ii) an anhydride.

In an embodiment, the primer composition comprises less than 0.001 wt % of an isocyanate, based on the weight of the primer composition. In an embodiment, the primer composition does not comprise an isocyanate compound. In an embodiment, the primer composition is halogen (e.g., chlorine) free.

In an embodiment, the functionalized olefin-based polymer of the primer composition is a maleic anhydride (MAH) functionalized ethylene-based polymer. In an embodiment, the functionalized styrenic block copolymer of the primer composition is a maleic anhydride (MAH) functionalized styrenic block copolymer. In an embodiment, the weight ratio of the functionalized olefin-based polymer to the functionalized styrenic block copolymer is from 2.0/1.0 to 6.0/1.0, and further from 3.0/1.0 to 5.0/1.0. In an embodiment, the weight ratio of the functionalized olefin-based polymer to the functionalized styrenic block copolymer is from 95/5 to 10/90. In an embodiment, the primer composition further comprises a solvent composition comprising at least one hydrocarbon solvent. In an embodiment, the solvent composition of the primer composition comprises a ketone. In an embodiment, the solvent composition comprises a hydrocarbon solvent and a ketone, in a weight ratio of from 99.5/0.5 to 80/20, or from 95/5 to 85/15.

In an embodiment, the invention provides an article comprising at least one component formed from the primer composition. In an embodiment, the article is a tile comprising the first composition as a primer layer situated between and adhered to a wear layer and to a top coat layer.

In an embodiment, the wear layer comprises a propylene-based polymer and the top coat layer comprises a UV-curable urethane-acrylate polymer.

The invention also provides a method of making the (first) composition. In an embodiment, the method comprises mixing together at least a functionalized olefin-based polymer, a functionalized styrenic block copolymer, a solvent, and optional additives.

The invention also provides a method of fabricating a tile. In an embodiment, the method comprises applying the (first) composition onto a substrate (e.g., a wear layer) comprising at least one layer formed from a second composition comprising a propylene-based polymer to form a film at least partially in direct contact with the propylene-based polymer layer of the substrate; allowing the film to dry; and applying a coating (e.g., a top coat) comprising a urethane/acrylic copolymer onto the film.

Functionalized Olefin-Based Polymer

The first composition comprises a functionalized olefin-based polymer. A functionalized olefin-based polymer comprises a bonded functional group, which group comprises at least one heteroatom (i.e., O and N).

In an embodiment, the functionalized olefin-based polymer is selected from a functionalized ethylene-based polymer or a functionalized propylene-based polymer. In an embodiment, the functionalized olefin-based polymer is a functionalized ethylene-based polymer. In a further embodiment, the functionalized olefin-based polymer is a functionalized ethylene/α-olefin interpolymer and further a functionalized ethylene/α-olefin copolymer. Representative α-olefins include, but are not limited to, $C_3$-$C_{20}$ α-olefins, or $C_3$-$C_{10}$ α-olefins, or $C_4$-$C_{20}$ α-olefins, or $C_4$-$C_{10}$ α-olefins. Representative α-olefins include propylene, 1-butene, 1-pentene, 1-hexene, 1-heptene and 1-octene.

In an embodiment, the functionalized olefin-based polymer comprises a carboxylic acid and/or an anhydride functional group, and an amino or an amine functional group. In an embodiment, the functional group is grafted pendant to the polymer chain. The functional group may also be incorporated through copolymerization of a suitable monomer containing the desired functional group.

In an embodiment, the functionalized olefin-based polymer is a functionalized ethylene/α-olefin interpolymer selected from the group consisting of the following: an anhydride-functionalized ethylene/α-olefin interpolymer, a carboxylic-acid-functionalized ethylene/α-olefin interpolymer, an amine-functionalized ethylene/α-olefin interpolymer, a hydroxyl-functionalized ethylene/α-olefin interpolymer, and combinations thereof.

In an embodiment, the functionalized olefin-based polymer is a maleic-anhydride (MAH) functionalized ethylene-based polymer. In an embodiment, the functionalized olefin-based polymer is a maleic-anhydride (MAH) functionalized ethylene/α-olefin interpolymer. In a further embodiment, the functionalized olefin-based polymer is a maleic-anhydride functionalized ethylene/α-olefin copolymer. Suitable α-olefins include the $C_3$-$C_8$ α-olefin, and preferably, the $C_4$-$C_8$ α-olefins.

Nonlimiting examples of suitable functionalized olefin-based polymers include maleic anhydride (MAH)-grafted copolymers (for example, AMPLIFY GR 216, and AFFINITY GA 1000R, available from The Dow Chemical Company).

In an embodiment, the functionalized olefin-based polymer contains from 0.1 to 10 wt %, or from 0.2 wt % to 8.0 wt %, or from 0.5 wt % to 6.0 wt %, or from 0.5 wt % to 4.0 wt %, or from 0.5 wt % to 2.0 wt % of the functional group, based on the weight of the functionalized olefin-based polymer.

In an embodiment, the functionalized olefin-based polymer has a density of from 0.850 to 0.940 g/cc, or from 0.855 to 0.920 g/cc, or from 0.860 to 0.900 g/cc, or from 0.865 to 0.890 g/cc, or from 0.870 to 0.885 g/cc, or from 0.870 to 0.880 g/cc (1 cc=1 cm$^3$).

In an embodiment, the functionalized olefin-based polymer has a melt index (MI) of 0.1 to 100 g/10 min, or from 0.2 to 50 g/10 min, or from 0.4 to 20 g/10 min, or from 0.6 to 10 g/10 min, or from 0.8 to 5.0 g/10 min, or from 1.0 to 2.0 g/10 min.

In an embodiment, the functionalized olefin-based polymer has a melting point ($T_m$) from 30 to 130° C., or from 30 to 100° C., of from 30 to 70° C., or from 30 to 50° C.

The functionalized olefin-based polymer may comprise two or more embodiments discussed herein.

Functionalized Styrenic Block Copolymer

The first composition comprises a functionalized styrenic block copolymer. A functionalized styrenic block copolymer comprises a bonded functional group, which group comprises at least one heteroatom (i.e., 0 and N). A "styrenic block copolymer" is an elastomer having at least one block segment of a styrenic monomer in combination with another block segment of another comonomer. The structure of the styrenic block copolymers can be of the linear or radial type, and of the diblock or triblock type.

Nonlimiting examples of suitable styrenic block copolymers include styrene-isoprene-styrene block copolymers (SIS), styrene-butadiene-styrene block copolymers (SBS), styrene-ethylene/butylene-styrene block copolymers (SEBS), styrene-isobutylene-styrene block copolymers (SIBS), styrene-ethylene-propylene-styrene block copolymers (SEPS), and mixtures thereof. Styrenic block copolymers are available from Dexco Polymers under the trademark VECTOR, from Kraton Corporation under the trademark KRATON (e.g., KRATON FG1901G), and from Dynasol, under the trademark SOLPRENE 4114A, 4213A, and the like.

In an embodiment, the functionalized styrenic block polymer comprises in polymerized form, styrene and ethylene and/or one alpha-olefin, and a carboxylic acid and/or an anhydride functional group. Such a functional group can be grafted pendant to the polymer chain. The functional group can also be incorporated through copolymerization of a suitable monomer containing the desired functional group.

In an embodiment, carboxyl groups are grafted onto a preformed styrenic block copolymer. In another embodiment, acid anhydride groups are grafted onto a preformed styrenic block copolymer. Nonlimiting examples of unsaturated carboxylic acid and acid anhydride compounds that can be grafted onto the preformed styrenic block copolymer include maleic acid, fumaric acid, itaconic acid, acrylic acid, methacrylic acid, crotonic acid, maleic anhydride, and itaconic anhydride.

In an embodiment, the functionalized styrenic block copolymer is selected from anhydride-functionalized styrenic block copolymer, carboxylic-acid-functionalized styrenic block copolymer, hydroxy-functionalized styrenic block copolymer, amine-functionalized styrenic block copolymer, and combinations thereof. In an embodiment, the functionalized styrenic block copolymer is a maleic-anhydride (MAH) functionalized styrenic block copolymer.

In an embodiment, the functionalized styrenic block copolymer contains from 20 to 60 wt %, or from 20 to 50 wt %, or from 20 to 40 wt % polymerized styrene, based on the weight of the functionalized styrenic block polymer.

In an embodiment, the functionalized styrenic block copolymer contains from 0.1 to 10 wt %, or from 0.5 to 5.0 wt % of the functional group, based on the weight of the functionalized styrenic block copolymer.

In an embodiment, the functionalized styrenic block copolymer is a styrene-ethylene/butylene-styrene block copolymer (SEBS) containing from 20 to 40 wt % polymerized styrene and from 0.5 to 2.0 wt % maleic anhydride, based on the weight of the functionalized styrenic block copolymer.

In an embodiment, the functionalized styrenic block copolymer has a solution viscosity from 2 to 10 Pa·s, measured in a solution of toluene, at 25 C, and 25 wt % of the copolymer, based on the weight of the solution.

In an embodiment, the functionalized styrenic block copolymer has a melt flow (MF) of from 10 to 30 g/10 min, measured in accordance with ASTM D1238, 230° C./5.0 kg weight.

In an embodiment, the functionalized styrenic block copolymer has a weight average molecular weight ($M_w$) of from 50,000 to 100,000 g/mol.

In an embodiment, the functionalized styrenic block copolymer has a molecular weight distribution ($M_w/M_n$) of 1.2 to 2.0.

The present functionalized styrenic block copolymer may comprise two or more embodiments discussed herein.

Solvent Composition

In embodiments, the first composition includes a solvent composition. A solvent composition may comprise one solvent or a mixture of two or more solvents.

In an embodiment, the solvent composition comprises at least one hydrocarbon solvent. In an embodiment, the solvent composition optionally includes a polar solvent.

As used herein, a "a hydrocarbon solvent" is a solvent that contains only hydrogen and carbon atoms, including branched or unbranched, saturated or unsaturated, cyclic, polycyclic or acyclic species, and combinations thereof. In an embodiment, the hydrocarbon solvent is selected from aromatic hydrocarbon solvents, aliphatic hydrocarbon solvents, and combinations thereof.

An aromatic hydrocarbon is a hydrocarbon that contains one or more benzene rings. Nonlimiting examples of aromatic hydrocarbon solvents include toluene and xylene. In an embodiment, the hydrocarbon solvent is an aromatic hydrocarbon solvent that is toluene.

An aliphatic hydrocarbon is a hydrocarbon that is an alkane, an alkene, an alkyne, or a derivative of an alkane, an alkene or an alkyne. Nonlimiting examples of aliphatic hydrocarbon solvents include hexene, cyclohexane and methylcyclohexane (MCH). In an embodiment, the hydrocarbon solvent is an aliphatic hydrocarbon solvent containing methylcyclohexane (MCH).

A polar solvent is a solvent in which there is either a permanent separation of positive and negative charges in the solvent molecules, or the centers of positive and negative charges do not coincide. A polar solvent has a polar plus hydrogen bonding portion greater than 0, as opposed to hydrocarbon solvents in which the polar plus hydrogen bonding portion is 0. Nonlimiting examples of polar solvents include alcohols, ketones and esters.

In an embodiment, the polar solvent is a ketone. Nonlimiting examples of suitable ketones include acetone, methyl ethyl ketone and cyclohexanone.

In an embodiment, the polar solvent is an ester. Nonlimiting examples of suitable esters include butyl acetate and ethyl acetate.

In an embodiment, the solvent composition comprises from 0 to 100 wt % of the hydrocarbon solvent, based on the total weight of the solvent composition.

In an embodiment, the solvent composition comprises 60 to 100 wt % of a hydrocarbon solvent and 0 to 40 wt % of a polar solvent, based on the total weight of the solvent composition.

In an embodiment, the solvent composition comprises from 80 wt % to 99.5 wt % of a hydrocarbon solvent and from 0.5 wt % to 20 wt % of a polar solvent, based on the total weight of the solvent composition.

The solvent composition may comprise two or more embodiments discussed herein.

Additives

In some embodiments, the composition can optionally include one or more compatible additives.

Suitable additives include, but are not limited to, cross-linking agents, antioxidants, suspension aids, process oils, plasticizers, lubricants, viscosity control agents, thickeners, slip agents, anti-blocking agents, tackifier resins, coupling agents, processing aids, ultraviolet (UV) absorbers or stabilizers, antimicrobial agents, anti-static agents, colorants, pigments, inorganic fillers, and combinations thereof. Such additives can be employed in a desired amount to achieve their desired effect. In an embodiment, the composition can comprise a combined weight of one or more additives in an amount of 0.1 to 12 wt %, or from 0.5 to 8.0 wt %, based on the weight of the composition.

First Composition

In an embodiment, the invention provides a first composition. In an embodiment, the first composition includes: (A) a functionalized olefin-based polymer; and (B) a functionalized styrenic block copolymer. In embodiments, the first composition further includes: (C) a solvent composition comprising a hydrocarbon solvent. In an embodiment, the first composition is a primer composition.

The functionalized olefin-based polymer, functionalized styrenic block copolymer, and solvent composition may be any respective functionalized olefin-based polymer, functionalized styrenic block copolymer, and solvent composition disclosed herein.

In an embodiment, the first composition comprises from 1 to 20 wt % of the functionalized olefin-based polymer, based on the total weight of the composition. In an embodiment, the first composition comprises from 1 to 20 wt % of the functionalized styrenic block copolymer, based on the total weight of the first composition. In an embodiment, the first composition comprises from 60 to 98 wt % of the solvent composition, based on the total weight of the first composition. In an embodiment, the first composition comprises from 1 to 20 wt % functionalized olefin-based polymer, from 1 to 20 wt % functionalized styrenic block copolymer, and from 60 to 98 wt % solvent composition, based on the total weight of the first composition. The first composition optionally comprises one or more additives. In an embodiment, the first composition comprises from 0.1 to 12 wt % additive, based on the weight of the first composition.

In an embodiment, the weight ratio of the functionalized olefin-based polymer to the functionalized styrenic block polymer, in the first composition, is 90:10, 85:15, 75:25, or 50:50 to 25:75, or 15:85, or 10:90. In an embodiment, the weight ratio of the functionalized olefin-based polymer to the functionalized styrenic block copolymer is from 2.0/1.0 to 6.0/1.0, and further from 3.0/1.0 to 5.0/1.0.

In an embodiment, the weight ratio of the total polymer content (functionalized olefin-based polymer and functionalized styrenic block copolymer) to the solvent composition in the first composition is from 5:95 to 40:60. In an embodiment, the weight ratio of the total polymer content (functionalized olefin-based polymer and functionalized styrenic block copolymer) to the solvent composition in the first composition is 5:95, or 10:90, or 15:85, or 20:80, or 25:75, or 30:70, or 35:65, or 40:60.

In an embodiment, the first composition can be prepared by: (a) mixing the functionalized olefin-based polymer with a solvent composition containing a hydrocarbon solvent at a temperature above the highest melting point of the functionalized olefin-based polymer under agitation for 1 or 2 hours in order to dissolve the functionalized olefin-based polymer in the solvent composition, and (b) separately mixing the functionalized styrenic block copolymer with a solvent composition containing a hydrocarbon solvent at a temperature above the highest melting point of the functionalized styrenic block copolymer under agitation for 1 or 2 hours in order to dissolve the functionalized olefin-based polymer in the solvent composition, and then (c) mixing the two solutions together at room temperature ("Cold Blending") or at a temperature of at least 80° C. ("Hot Blending").

In another embodiment, the first composition can be prepared by mixing the functionalized olefin-based polymer and functionalized styrenic block copolymer with a solvent composition containing a hydrocarbon solvent at a temperature above the highest melting point of the functionalized polymers under agitation for 1 or 2 hours in order to dissolve the functionalized olefin-based polymer and functionalized styrenic block copolymer in the solvent composition.

In an embodiment, the first composition can be prepared by adding the functionalized olefin-based polymer and functionalized styrenic block copolymer as polymer pellets ("Polymer Pellets Blending") into a solvent composition containing a hydrocarbon solvent, heating to a temperature of at least 80° C., and agitating the solution for 1 or 2 hours, in order to dissolve the functionalized olefin-based polymer and functionalized styrenic block copolymer in the solvent composition.

In an embodiment, the first composition has a Brookfield Viscosity from 100 to 8000 cP, or from 500 to 7000 cP, or from 1500 to 6000 cP, or from 1000 to 5000 cP.

Advantageously, the functionalized olefin-based polymer and functionalized styrenic block copolymer remain dissolved in the solvent of the first composition, even when the temperature of the first composition is reduced to room temperature, allowing the first composition to be used at room temperature. The ability to be used at room temperature is advantageous for easy processing because no special precautions are necessary to keep the first composition hot or to apply it hot to the substrate.

In an embodiment, the first composition comprises:

(A) from 1 wt % to 20 wt % of a functionalized ethylene/α-olefin interpolymer;

(B) from 1 wt % to 20 wt % of a functionalized styrenic block copolymer comprising greater than, or equal to, 30 wt % polymerized styrene; and (C) from 55 wt % to 97.9 wt % of a solvent composition comprising a hydrocarbon solvent.

In an embodiment, the first composition has at least one of the following properties:

(1) a Brookfield Viscosity from 100 cP to less than 8000 cP;

(2) a weight ratio of functionalized olefin-based polymer to functionalized styrenic block polymer from 90:10 to 10:90, or from 2.0/1.0 to 6.0/1.0; and (3) a weight ratio of total polymer content to solvent composition from 20:80 to 5:95, or from 10:90 to 5:95.

The first composition may comprise two or more embodiments discussed herein.

Articles of Manufacture

In an embodiment, the invention provides an article.

In an embodiment, the article includes a substrate, and at least one component formed from the first composition disclosed herein comprising a functionalized olefin-based polymer and a functionalized styrenic block copolymer. In an embodiment, the at least one component is a coating on the substrate. In an embodiment, the coating is an adhesive layer. In an embodiment, at least one side of the substrate is coated with the first composition.

In an embodiment, the first composition disclosed herein comprising a functionalized olefin-based polymer and a functionalized styrenic block copolymer can be applied to a substrate as a primer layer and dried to provide an adhesive layer between two material layers of the article.

In an embodiment, the article is a multilayered structure such as, but not limited to, tiles, resilient flooring, slip-resistant flooring, wall paper, countertops, wall coverings, automobile dash boards, automotive coatings, and wall coverings, among others. In various embodiments, the first composition can be combined with other materials to form an adhesive layer within a laminated substrate (e.g., a tile, floor covering, etc.).

Substrate (with Propylene-Based Layer)

In an embodiment, the substrate (e.g., wear layer) of the article comprises at least one layer formed from a second composition comprising a propylene-based polymer, which is at least partially in contact with the coating formed from the first composition disclosed herein.

In an embodiment, the second composition comprises (A) a propylene-based polymer; and (B) a solvent composition.

In an embodiment, the second composition comprises at least 50, or at least 60, or at least 70, or at least 80, or at least 90 or at least 95, and up to 99.5 wt %, of a propylene-based polymer, based on the total weight of the second composition. In an embodiment, the second composition comprises a propylene-based polymer in an amount of from 50 to 99.5, or from 80 to 99.5, or from 90 to 99.5, wt %, based on the total weight of the second composition.

In an embodiment, the propylene-based polymer may be a propylene homopolymer, propylene-based interpolymer, or a propylene-based copolymer.

In an embodiment, the propylene-based polymer is a propylene/ethylene interpolymer, and further a propylene/ethylene copolymer.

In an embodiment, the propylene-based polymer is a propylene/α-olefin interpolymer. In a further embodiment, the propylene/α-olefin polymer is a propylene/α-olefin copolymer.

In an embodiment, the propylene-based polymer is a polypropylene-based plastomer or elastomer. Polypropylene-based plastomers (PBP) or propylene-based elastomers (PBE) include reactor grade copolymers of propylene having a heat of fusion less than about 100 J/g and MWD<3.5. PBPs generally have a heat of fusion less than about 100 J/g, and a weight percent ethylene or other α-olefin in the range of from 3 to 15 wt %. PBEs generally have a heat of fusion less than about 40 J/g and a weight percent ethylene or other α-olefin in the range of from 10 to 15 wt % ethylene.

In an embodiment, the propylene-based polymer is a random propylene/α-olefin interpolymer. A random propylene/α-olefin interpolymer is an interpolymer in which the monomers are randomly distributed across the polymer chain.

Examples of α-olefin comonomers suitable for use in the propylene based polymer include, but are not limited to, $C_{2-20}$ linear, branched, or cyclic α-olefins. Examples of $C_{2-20}$ α-olefins include ethylene (considered an α-olefin for purposes of this invention), 1-butene, 1-pentene, 1-hexene, 1-octene, 1-decene, 1-dodecene, 1-tetradecene, 1-hexadecene, and 1-octadecene. In embodiments, the α-olefins can also have a cyclic structure such as cyclohexane or cyclopentane, resulting in an α-olefin such as 3-cyclohexyl-1 propene (allyl cyclohexane) and vinyl cyclohexane. Illustrative propylene/α-olefin interpolymers include propylene/ethylene, propylene/1-butene copolymers, propylene/1-hexene copolymers, propylene/1-octene copolymers, or combinations of two or more thereof. In an embodiment, the propylene based polymer is a propylene/ethylene interpolymer. In a further embodiment, the propylene/ethylene polymer is a propylene/ethylene copolymer.

In an embodiment, the propylene-based polymer is a random propylene/ethylene interpolymer, and further a random propylene/ethylene copolymer.

Commercial examples of propylene-based polymers include, but are not limited to, random propylene/ethylene interpolymers such as VERSIFY polymers (The Dow Chemical Company), VISTAMAX polymers (Exxon Mobil Chemical Co.), LICOCENE polymers (Clarient), and non-random propylene copolymers such as Braskem RCP GD83K and DS6D81, Exxon Mobil PP122 and PP9513. Other examples include INSPIRE polymers (Braskem) and PRO-FAX polymers (Lyondell Basell).

In an embodiment, the propylene-based polymer has a molecular weight distribution (MWD) from 2.0 to 3.4, or from 2.2 to 3.2, or from 2.4 to 3.0, or from 2.6 to 2.8.

In some embodiments, the propylene-based polymer has a percent (%) crystallinity from 20% to 60%, or from 30% to 50%, as measured by differential scanning calorimetry ("DSC").

In an embodiment, the propylene-based polymer has a density from 0.880 to 0.920 g/cc, or from 0.885 to 0.915 g/cc, or from 0.890 to 0.910 g/cc, or from 0.895 to 0.900 g/cc, as determined according to ASTM D 792.

In an embodiment, the propylene-based polymer has a melt flow rate (MFR) from 0.5 to 30 g/10 min, or from 3.0 to 20 g/10 min, or from 5.0 to 15 g/10 min as measured by ASTM D1238 at 230° C./2.16 kg.

In an embodiment, the propylene-based polymer has a melting point of at least 100° C. to 150° C.

In an embodiment, the propylene-based polymer component can be a combination of two or more of the described propylene-based polymers.

In some embodiments, the second composition comprises at least one inorganic filler. In embodiments, a sufficient amount of filler is included in the second composition to provide a layer (e.g., a wear layer) with a desired level of wear resistance which will not interfere with contact clarity of the layer. In an embodiment, the second composition comprises filler in an amount from 0.5 to 10 wt %, based on the total weight of the second composition. In embodiments, the concentration of the filler in the second composition is sufficient to provide a layer (e.g., a wear layer) having a thickness of from 10 to 60 mils with a scratch depth less than 1 μm and an internal haze of less than 40%.

Suitable fillers include, but are not limited to, silicon dioxide, aluminum oxide, titanium oxide, silicon carbide, glass particles, glass beads, talc, and mica, among others. In embodiments, the filler is a hydrophobic, fumed silica. Examples of commercially available fillers include AEROSIL hydrophobic, fumed silicas (Evonik Industries AG). In some embodiments, the second composition comprises an inorganic micro- or nano-particle filler dispersed within the propylene-based polymer.

In some embodiments, the filler can be melt-mixed in a propylene-based polymer to make a filler-containing masterbatch containing from 10 to 90 wt % filler loading.

In some embodiments, the second composition can optionally include one or more compatible additives. Examples of suitable additives include, but are not limited to, crosslinking agents, antioxidants, suspension aids, process oils, plasticizers, lubricants, viscosity control agents, slip agents, anti-blocking agents, tackifiers, coupling agents, processing aids, ultraviolet (UV) absorbers or stabilizers, antimicrobial agents, anti-static agents, colorants or pigments, and combinations thereof. Such additives can be employed in a desired amount to achieve their desired effect. In an embodiment, the second composition can comprise a combined weight of one or more additives in an amount of 0.1 to 5 wt %, based on the weight of the second composition.

In an embodiment, the second composition is a crosslinked composition. In an embodiment, the second composition comprises a crosslinked composition comprising filler dispersed therein.

The second composition comprising a propylene-based polymer may comprise two or more embodiments discussed herein.

In an embodiment, the first composition disclosed herein comprising a functionalized olefin-based polymer and a functionalized styrenic block copolymer is applied onto and at least partially in contact with the propylene-based polymer layer of the substrate formed from the described second composition. In some embodiments, the first composition can be applied as a primer layer on a surface of the propylene-based polymer layer and dried to provide an adhesive layer.

In an embodiment, the article is formed from a substrate comprising a layer comprising a propylene-based polymer, a film layer, and a component formed from the disclosed first composition comprising a functionalized olefin-based polymer and a functionalized styrenic block copolymer, such as an adhesive layer, that is situated between and in contact with the propylene-based polymer layer of the substrate and the film layer. In an embodiment, no separation (either small separation or full separation) is observed between the propylene-based polymer layer of the substrate e.g., a polyolefin substrate, and the film layer during a crosshatch adhesion test.

In an embodiment, articles can be prepared by applying a layer of the first composition onto a propylene-based polymer layer of a substrate, allowing the layer to dry, and then applying a top coat film layer (e.g., urethane/acrylic copolymer layer) onto the dried layer of the first composition.

In an embodiment, the article is a tile having a total thickness of from 5 mm to 25 mm.

In an embodiment, the article is a tile, the substrate comprises a layer comprising a propylene-based polymer, the film layer comprises a UV-curable urethane-acrylate copolymer, and the component formed from the composition of the invention is an adhesive layer situated between and in contact with the propylene-based polymer layer of the substrate and the urethane-acrylate copolymer film layer. In an embodiment, the substrate (e.g., wear layer) has a thickness of from 50 to 100 percent of the total thickness of the tile. In an embodiment, the substrate (e.g., wear layer) has a total thickness of from 0.5 to 5.0 mm, o from 0.5 to 2.0 mm, or from 0.5 to 1.0 mm. In an embodiment, the urethane-acrylate copolymer film layer is a top coat layer (or outermost layer), the substrate is a wear layer of a multilayer tile construction, and the propylene-based polymer layer is at least one layer of the wear layer. In an embodiment the article is a multilayer resilient floor tile.

FIG. 1 is a depiction of an example of a multilayer tile. In embodiments, the laminated article (e.g., tile) (10) can include a base layer (12), a décor film (or printed layer) (14) affixed to a surface of the base layer (12), a wear layer (16) overlying and affixed to the surface of the décor (or printed) film (14), an adhesive primer layer (18) (formed from the inventive (first) composition comprising a functionalized olefin-based polymer and a functionalized styrenic block copolymer) overlying and affixed to the surface of the wear layer (16), and a top coat layer (20) overlying and affixed to the adhesive primer layer (18). In embodiments, the laminated article (10) can include one or more additional material layers.

In an embodiment, a laminated, multilayer tile can be prepared using one or more olefin-based polymers (often filled) including a layer comprising one or more olefin-based polymers as a base layer (12). A décor film (or printed layer) (14) also made of an olefin-based polymer can then be laminated to the base layer (12). The décor film (14) can then be covered by a propylene-based polymer wear layer (16) that is can be laminated on top of the décor film (14). An adhesive primer layer (18) (formed from the inventive composition comprising a functionalized olefin-based polymer and a functionalized styrenic block copolymer) is then coated onto the wear layer (16) and dried. A UV resin top coat (20) is then applied for added protection.

Base Layer.

In embodiments, the base layer (12) can comprise a film, sheet or fabric. In an embodiment, the base layer (12) is a multilayer construction layer comprising one or more olefin-based polymers. In an embodiment, the base layer comprises an ethylene/α-olefin copolymer, a functionalized ethylene/α-olefin copolymer, or a combination thereof. Use of olefin-based polymers allows for a tunable flexibility of the base layer (12) (and thus the entire structure) by modifying the comonomer and comonomer content of the olefin-based polymer to adjust the resulting density and flexibility. In embodiments, the base layer further comprises a filler such as calcium carbonate, coal fly ash, and the like, in an amount up to 80 wt %, based on the weight of the base layer. Commercial examples of ethylene/α-olefin copolymers include homogeneously branched, substantially linear ethylene/α-olefin polymers, e.g., ENGAGE™ polyolefin elastomers (e.g., ENGAGE™ 8003, 8400, 8450 and 8480 polyolefin elastomers) and AFFINITY™ polyolefin plastomers (The Dow Chemical Company), EXCEED™ and EXACT™ polymers (ExxonMobil Chemical Company) and TAFMER™ polymers (Mitsui Chemical Company). Commercial examples of functionalized ethylene-based polymers include maleic anhydride (MAH) grafted copolymers, e.g., AMPLIFY™ GR 216 and AFFINITY™ GA 1000R (The Dow Chemical Company). In an embodiment, the base layer (12) has a thickness of from 0.76 to 1.27 mm (from 30 to 50 mil). An extruder can be used to extrude a filled layer as the base layer.

Décor Film.

The décor film (14) is used to give the finished article a look of a material such as, for example, wood or marble, or a printing. In embodiments, the décor film (or printed layer) (14) can comprise a gravure print, a digital print, a flexo print, a transfer print, a pad print, a stamping print, a decorative painting, or any combination thereof. In embodiments, the décor film (or printed layer) comprises a substrate, which in embodiments, comprises one or more polymer films and/or papers. In embodiments, the décor film (or printed layer) comprises a non-PVC thermoplastic film (e.g., acrylic, polyolefin, ionomer, polyester, etc.). In embodiments, the décor film (14) comprises a biaxially oriented polypropylene (BOPP). In an embodiment, the décor film (14) has a thickness of from 0.025 to 0.050 mm (from 1 to 2 mil). In an embodiment, a layer of an adhesive primer can be applied to the decorative side of the décor film to allow for easier adhesion to the wear layer (16).

Wear Layer.

In embodiments, the wear layer (substrate) (16) comprises a layer comprising a propylene-based polymer formed from the second composition described herein. In an embodiment, the wear layer comprises a propylene/α-olefin interpolymer (e.g., plastomer or elastomer). In an embodiment, the propylene-based polymer is a random propylene/α-olefin interpolymer. In an embodiment, the propylene-based polymer is a propylene/ethylene copolymer. Commercial examples of propylene-based polymers include, but are not limited to, random propylene/ethylene interpolymer plastomers and elastomers such as VERSIFY™ polymers (The Dow Chemical Company), and VISTAMAX™ polymers (Exxon Mobil Chemical Co.), INSPIRE™ polymers (Braskem) and PRO-FAX™ polymers (Lyondell Basell).

In embodiments, the wear layer (16) includes at least one inorganic filler to improve the hardness and scratch and abrasion resistance of the wear layer, which has a high level of contact clarity, for example, hydrophobic, fumed silica, alumina, titania, glass particles, and other such fillers known in the art. In an embodiment, the wear layer (16) has a thickness of from 0.50 to 1.0 mm (from 20 to 40 mil). The wear layer should have reasonable contact clarity such that the décor layer can be seen through it. The wear layer can also be extruded with a single screw extruder.

Primer Layer.

In an embodiment, the (first) composition of the invention can be applied to the surface of the wear layer (16) as a primer layer and dried to produce an adhesive primer layer (18). In an embodiment, the first composition can be applied as a single layer or a multiple layers. Nonlimiting examples of suitable methods to apply the first composition to the substrate include drawdown, rod coating, brushing, dipping, pouring, casting, extrusion, and spraying techniques. In an embodiment, the first composition is poured onto a substrate and spread out by means of a coating bar or grooved (wound) rod. In an embodiment, the first composition is applied as a pre-formed film.

In embodiments, the thickness of adhesive primer layer (18) can be from 0.00127 to 0.025 mm (0.5 to 1 mils). The adhesive primer layer must not be too thin or poor adhesion to the wear layer (16) (and overlying top layer (20)) results, and not be too thick so as to compromise internal haze and/or flexibility of the article (10).

In an embodiment, the adhesive primer layer (18) comprises a maleic-anhydride functionalized ethylene/α-olefin interpolymer and a styrenic block copolymer. In an embodiment, the adhesive primer layer comprises a maleic-anhydride (MAH) functionalized ethylene/octene copolymer and a styrene-ethylene-butylene-styrene (SEBS) block copolymer (polystyrene content of 30%). Commercial examples of maleic-anhydride (MAH)-grafted ethylene/α-olefin copolymers include AMPLIFY™ GR 216, and AFFINITY™ GA 1000R (The Dow Chemical Company). Commercial examples of styrenic block copolymers include KRATON® (e.g., KRATON® FG1901 G) (Kraton Corporation), VECTOR® (Dexco Polymers), and SOLPRENE® (e.g., SOLPRENE® 4114A, SOLPRENE® 4213A) (Dynasol).

In various embodiments, the first composition can be applied as a primer layer to the wear layer and dried to produce an adhesive primer layer. An adhesive primer layer is formed from the dried composition including a functionalized olefin-based polymer, a functionalized styrenic block copolymer, and no, or substantially no, solvent. In an embodiment, the primer layer is dried after it is applied to the substrate to evaporate at least 90 wt %, or 98 wt %, or 99 wt %, or 100 wt % of the solvent composition, based on the weight of the solvent composition in the first composition, to form an adhesive primer layer (18). In an embodiment, 100 wt % of the solvents are evaporated, based on the weight of the solvent composition in the first composition. Nonlimiting examples of methods to dry the primer composition after it has been applied to the substrate include drying the article in an oven at a temperature of from 23 to 40° C., for from 2 to 30 minutes to produce the adhesive primer layer. In an embodiment, the coating, and further the adhesive primer layer, has a coat weight after drying of from 1 to 12 g/m$^2$.

Top Coat Layer.

The top coat is an extra-finish coating layer that provides enhanced abrasion and mar characteristics, and also controls the gloss of the finished product. In embodiments, the top coat layer (20) comprises a UV curable urethane/acrylate copolymer. A urethane/acrylate copolymer generally comprises an acrylate moiety at an end of the copolymer. A urethane/acrylate coating generally comprises a viscosifer, such as an acrylate monomer, and/or an N-vinyl pyrrolidone, to reduce viscosity. A urethane/acrylate coating can be cured by irradiation such as UV light and/or electron beam. In embodiments, the top coat composition includes a curing agent. In embodiments, the top coat composition includes a photoinitiator such as a benzophenone and an amine synergist. Commercial examples of UV top coats, include curable urethane/acrylate copolymers, such as PHOTOGLAZE UV coating (Akzo Nobel Coatings International B.V.). In an embodiment, the top coat layer (20) has a thickness of from 0.0127 to 0.05 mm (from 0.5 to 2 mil).

Representative Process to Make the Tile.

In an embodiment, an all-olefin, multilayer tile can be prepared in a continuous extrusion coating process. In an embodiment, a filled backing layer can be extruded from an extruder/die setup, into a flexible or semi-rigid backing film or sheet to form the base layer (12). While still hot, a pre-fabricated décor film (14) can be fed from a roll and then held in place on a standard unwind stand and applied onto the base layer (12). A second extruder/die set up can then lay a molten wear layer (16) down onto the top of the décor layer (14). A primer layer of the (first) composition of the invention can be applied onto the top of the wear layer (16). After ambient cooling, and the optional application of cooling rolls, a top coat (20) can be applied onto the dried primer layer (18) at a standard coating station.

An article may comprise a combination of two or more embodiments described herein.

Definitions

Unless stated to the contrary, implicit from the context, or customary in the art, all parts and percents are based on weight, and all test methods are current as of the filing date of this disclosure.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Blend," "polymer blend" and like terms, as used herein, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

"Composition" and like terms, as used herein, includes a mixture or blend of two or more materials which comprise the composition, as well as reaction products and decomposition products formed from the materials of the composition. Typically, any reaction products and/or decomposition products are present in trace amounts.

"Elastomer" and like terms, as used herein, denote a polymer having viscoelasticity. Generally, elastomers will have lower tensile modulus and higher failure strain relative to other materials, such as thermoplastics.

"Ethylene-based polymer" and like terms, as used herein, refers to a polymer that comprises at least 50 wt % or a majority weight percent polymerized ethylene monomer (based on the total weight of the polymer), and optionally may comprise one or more polymerized comonomers.

"Ethylene/α-olefin copolymer" and like terms, as used herein, refers to a copolymer that comprises, in polymerized form, at least 50 wt % or a majority amount of ethylene monomer (based on the weight of the copolymer), and an α-olefin, as the only two monomer types. The α-olefin is randomly distributed within the copolymer. Thus, this term does not include an ethylene/α-olefin block copolymer.

"Ethylene/α-olefin interpolymer" and like terms, as used herein, refers to an interpolymer that comprises, in polymerized form, at least 50 wt % or a majority amount of ethylene monomer (based on the weight of the interpolymer), and at least one α-olefin that is randomly distributed within the interpolymer. Thus, this term does not include an ethylene/α-olefin block copolymer.

"Interpolymer" and like terms, as used herein, refers to polymers prepared by the polymerization of at least two different types of monomers. The generic term interpolymer includes copolymers (employed to refer to polymers prepared from two different types of monomers), and polymers prepared from more than two different types of monomers (e.g., terpolymers (three different monomer types)).

"Olefin-based polymer" and like terms, as used herein, refers to a polymer that comprises, in polymerized form, at least 50 wt % or a majority amount of an olefin, for example ethylene or propylene, based on the total weight of the polymer, and optionally one or more comonomers. Non-limiting examples of olefin-based polymers include ethylene-based polymers and propylene-based polymers.

"Plastomer" and like terms, as used herein, denote a polymer that softens when heated and hardens when cooled, yet remains flexible.

"Polymer" and like terms, as used herein, refers to a polymeric compound prepared by polymerizing monomers, whether of the same or a different type. The generic term polymer includes, but is not limited to, the term homopolymer (employed to refer to polymers prepared from only one type of monomer, with the understanding that trace amounts of impurities (e.g., catalyst and residues) can be incorporated into the polymer structure and/or within the bulk polymer). Trace amounts of impurities (e.g., catalyst and residues) can be incorporated into and/or within the polymer.

"Propylene-based polymer," and like terms, as used herein, refers to a polymer that comprises, in polymerized form, a majority amount of propylene monomer units (based on the weight of the polymer) and, optionally, one or more comonomers.

"Propylene-based copolymer" and like terms, as used herein, refers to a copolymer that comprises, in polymerized form, a majority amount of propylene monomer (based on the weight of the copolymer), and another monomer, as the only two monomer types.

"Propylene-based interpolymer," "propylene/α-olefin interpolymer," and like terms, as used herein, refers to a polymer that comprises, in polymerized form, a majority weight percent (wt %) of propylene monomer (based on the total weight of the polymer), and at least one comonomer.

"Propylene/α-olefin copolymer" and like terms, as used herein, refers to a copolymer that comprises, in polymerized form, a majority amount of propylene monomer (based on the weight of the copolymer), and an α-olefin, as the only two monomer types. The α-olefin is randomly distributed within the copolymer.

"Propylene/α-olefin interpolymer" and like terms, as used herein, refers to an interpolymer that comprises, in polymerized form, a majority amount of propylene monomer (based on the weight of the interpolymer), and at least one α-olefin.

"Propylene random interpolymer," "propylene random copolymer" and like terms, as used herein, refer to a polymer that comprises, in polymerized form, a majority amount of propylene monomer (based on the weight of the polymer), and at least one comonomer randomly distributed across the polymer chains.

The phrase "first film covers at least one surface of the substrate," as used herein, means that the first film covers ≥80, further ≥85, further ≥90%, and further ≥95% of the noted surface area of the substrate. The first film is adhered to the noted surface area. The film covers a surface area that intersects a vertical dimension of the substrate. See FIG. 2 (primer adhesive layer (18)).

Test Methods

Density is measured in accordance with ASTM D792, and reported as grams per cubic centimeter (g/cc or g/cm$^3$). An average of three (3) measurements were taken.

Melt Index, MI or I2 or $I_2$, for ethylene-based polymers is measured in accordance with ASTM D-1238, Condition 190° C./2.16 kilogram (kg) weight, and is reported in grams eluted per 10 minutes.

Melt Index, MI or I2 or $I_2$, for styrenic block copolymers is measured in accordance with ASTM D-1238, at 230° C./5.0 kg, and reported in grams eluted per 10 minutes.

Melt flow rates (MFR), in g/10 minutes, are determined according to ASTM D1238 (at 230° C./2.16 kg).

EXPERIMENTAL

The materials used in this study are shown in Table 1A.

TABLE 1A

Raw materials

| Component | Description | Source | Density g/cm$^3$ | Melt Index, $I_2$ · g/10 min | Melt Flow Rate, |
|---|---|---|---|---|---|
| AMPLIFY GR 216 | MAH-grafted ethylene/octene random copolymer | The Dow Chemical Co. | 0.875 | 1.3[a] | — |
| KRATON FG 1901 | MAH-grafted SEBS (functionalized SEBS (styrene/ethylene/butene/styrene) with 30 wt % styrene, based on the weight of the SEBS) (Solution viscosity** = 5 Pa · s) (M$_w$ = 78163 mol; M$_w$/M$_n$ = 1.62) | Kraton Polymers | 0.91 | 22[b] | 14-28[c] |
| HARDLEN F-2P | MAH-grafted chlorinated polyolefin (propylene-based polymer, Tm = 72° C., Tg = 8° C.) | Toyobo Company | — | — | — |
| ENGAGE 8842 | Ethylene/octene copolymer | The Dow Chemical Co. | 0.857 | 1.0 [a] | — |
| Polar solvent (ketone) | Cyclohexanone | Aldrich | 0.948 | — | — |
| Hydrocarbon solvent | Methylcyclohexane | Aldrich | 0.77 | — | — |
| PE1 Propylene/Ethylene copolymer, with density of 0.896-0.897 g/cm$^3$ and melt flow rate MFR of 8.0-12 g/10 min (ave. MFR = 10 g/10 min) | Propylene/ethylene copolymer (see WO 2017/003762) | The Dow Chemical Co. | — | — | — |

TABLE 1A-continued

Raw materials

| Component | Description | Source | Density g/cm³ | Melt Index, $I_2$ · g/10 min | Melt Flow Rate, |
|---|---|---|---|---|---|
| | (230° C./ 2.16 kg), MWD = 2.75; 41-42% crystallinity. | | | | |
| Filler Masterbatch, AEROSIL R9200* | 20 wt % AEROSIL R9200 silica particles plus 80 wt % random propylene-based copolymer carrier (d = 0.900 g/cc; MRF = 42 g/ 10 min (230° C./ 2.16 kg)) | Evonik Industries AG | — | — | — |
| Top Coat | PHOTOGLAZE ® UV COATING (Urethane/Acrylate-based top coat) Solution form (predominant solvent: xylene) | Akzo Nobel Coatings International B.V. | — | — | — |

[a]Melt Index, $I_2$, at 190° C./2.16 kg (ASTM D1238)
[b]Melt Index, $I_2$, at 230° C./5.0 kg (ASTM D1238)
[c]Melt Flow Rate, at 230° C./5.0 kg (ASTM D1238)
[d] Melt Flow Rate, at 2.16 kg @ 230° C. (ASTM D1238)
*AEROSIL R9200: modified, hydrophobic fumed silica; specific surface area = 150-190 m2/g (BET).
**Solution viscosity-25 wt % polymer in toluene at 25° C.

Preparation of Propylene-Based Substrate
Synthesis of PE1

A continuous solution polymerization was carried out in a controlled well-mixed reactor. Purified mixed alkanes solvent (ISOPAR E available from Exxon Mobil, Inc.), ethylene, propylene, and hydrogen (where used) were combined, and fed to a 52 gallon reactor. The feeds to the reactor were measured by mass-flow controllers. The temperature of the feed stream was controlled by use of a cooled heat exchanger, before entering the reactor. The catalyst component solutions were metered using pumps and mass flow meters. The reactor was run liquid-full, at approximately 550 psig pressure. Upon exiting the reactor, water and additive were injected into the polymer solution, to terminate remaining polymerization reactions. The solvent and unreacted monomers were removed during a two stage devolatization process of the post reactor, polymer solution process. The polymer melt was pumped to a die for underwater pelletization. See Tables 1B and 1C below.

TABLE 1B

Polymerization Conditions for PE1

| | C3 Propylene lb/hr | C2 Ethylene lb/hr | Mixed Alkanes Solvent lb/hr | $H_2$ sccm[1] | Temp. ° C. | Cat.[2] Conc. ppm | Cat. Flow lb/hr | Cocat-1[5] Conc. ppm | Cocat 1 Flow lb/hr |
|---|---|---|---|---|---|---|---|---|---|
| PE1 | 360 | 5.4 | 885 | 800 | 125 | 40 | 0.69 | 400 | 0.60 |

TABLE 1C

Polymerization Conditions for PE1

| | Cocat 2[6] Conc. ppm | Cocat 2 Flow lb/hr | Polym Rate[7] lb/hr | Conv[3] wt % | Polymer wt % | Eff.[4] |
|---|---|---|---|---|---|---|
| PE1 | 400 | 0.32 | 240 | 66.6 | 19.2 | 8.7 |

[1] Standard cm³/min.
[2] Catalyst: [[2',2'''-[1,2-cyclohexanediylbis(methylene-oxy-κO)]bis[3-(9H-carbazol-9-yl)-5-methyl[1,1'-biphenyl]-2-olato-κO]](2-)]hafnium dimethyl.
[3] Weight percent propylene conversion in reactor.
[4] Efficiency, 1,000,000 lb polymer/lb Hf.
[5] Cocatalyst-1 (Cocat 1): bis-hydrogenated tallow alkyl methylammonium tetrakis-pentafluorophenyl borate (from Boulder Scientific).
[6] Cocatalyst-2 (Cocat 2): modified methaluminoxane (MMAO-3A, from Akzo-Nobel).
[7] Polymerization Rate Preparation of Primer Compositions/Cast Films One test example primer composition (first composition) according to the invention and three comparative compositions were prepared, according to the formulations provided in Table 2 below.

TABLE 2

Primer Compositions

| Components (wt %) | Comp. Ex. A (wt %) | Comp. Ex. B (wt %) | Comp. Ex. C (wt %) | Inv. Ex. 1 (wt %) |
|---|---|---|---|---|
| AMPLIFY GR216 MAH-grafted ethylene/octene random copolymer | — | — | 5 | 8 |
| KRATON FG1901 (SEBS (30% polystyrene)) | — | — | — | 2 |
| HARDLEN F-2P (MAH-grafted carboxylated chlorinated polyolefin) | 5 | — | — | — |
| ENGAGE 8842 ethylene/octene copolymer | — | 5 | — | — |
| Methylcyclohexane (MCH) | 95 | 95 | 95 | 85.5 |
| Cyclohexanone | — | — | — | 4.5 |
| TOTAL (wt %) | 100 | 100 | 100 | 100 |
| Final solids, wt %, based on weight of primer composition | 5 | 5 | 5 | 10 |

Synthesis of Primer Solutions

Comparative Examples A, B and C were prepared as 5 wt % solutions as follows. To prepare the primer compositions, a 100-ml glass jar with a stir bar was placed on top of a magnetic stir/hot plate, and 0.5 gms of polymer followed by 9.5 gms of methylcyclohexane was added to the jar. The solution was heated to reflux for 15 minutes or until no trace of polymer was evident and the mixture became a uniform solution. The polymer solution was then cooled to room temperature.

Inventive Example 1 was prepared, same as above, except as a 10 wt % solution as a blend of the AMPLIFY GR216A and the KRATON FG1901, as follows. Here, 8 gms AMPLIFY GR216A and 2 gms KRATON FG1901 were measured into a 100-ml jar (with a stir bar) placed on top of a magnetic stir/hot plate, followed by 90 gms (95 wt/5 wt) MCH/cyclohexanone solvent mixture. The polymer/solvent mixture was heated to reflux for 15 minutes or until no trace of polymer was evident in the solution. After dissolution, the polymer solution was allowed to cool to room temperature.

Substrate samples composed of PE1 (propylene/ethylene copolymer) and the filler masterbatch were prepared as cast film according to the formulation provided in Table 3 below. The cast film conditions used a single 30 mm 25:1 L/D Collin extruder, equipped with two knife trim station and chill rollers. Screw speeds of 75 rpm, maximum heating temperatures of 230° C. and chill roll temperatures of 22° C. were utilized. Final dimensions of cast film: 165 mm×165 mm×0.762 mm (6.5 in×6.5 in×0.03 in).

TABLE 3

Substrate: Cast Film

| Blend Composition (wt %) | |
|---|---|
| Propylene/ethylene copolymer 1 PE1 | 95 wt % |
| Filler Masterbatch | 5 wt % |
| Cast Film thickness (mm) | 0.03 mm |
| Density (g/cc) | 0.903 |

Application of Primer Solutions to Substrate

The primer solutions were then applied to the above cast films (see Table 3). Approximately 1-2 ml of solution was applied to the surface of the cast film, and spread over the surface to evenly coat the surface. The solvent was allowed to evaporate overnight in a fume hood prior to the top coat application. A dried primer coat from 1.5-12 g/m² resulted. The coating weight was determined by measuring the area to be primed and weighing the substrate before and after the primer is dry.

Figure 2:
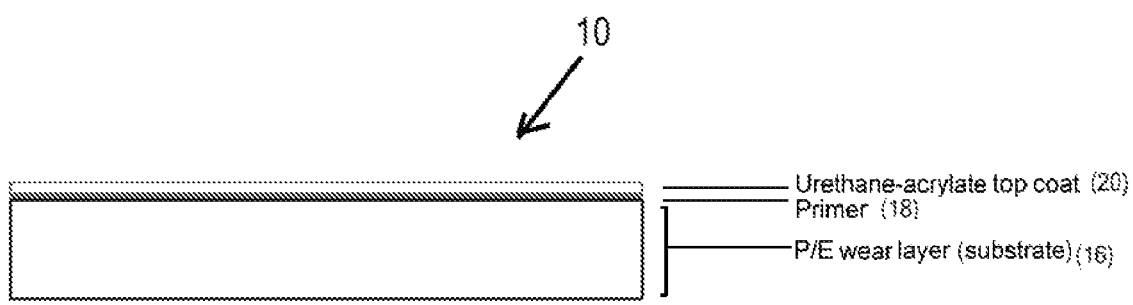
FIG. 2 depicts an embodiment of a three-layered tile.

This resulted in a primer coated film, i.e., the primer layer (18) coated on the wear layer (16) as shown in FIG. 2. Final dimensions of the primer coated film: 165 mm×165 mm×0.762 mm (6.5 in×6.5 in×0.03 in).

Application of Top Coat Layer

A top coat layer was then applied to the film coated substrate, using the following process.

The UV curable urethane/acrylate top coat material was applied to the surface of each dried primer film, as follows:
1. The film coated substrate (substrate cast film coated with the primer layer) was affixed on a metal backing (9.25×11 inches) with masking tape on all four sides, ensuring that the corners were devoid of air pockets which would allow for the top coat to seep to the back of film.
2. A "1-mil" film thickness was measured per instructions in an Elcometer 4340 Motorized Film Applicator Film Casting Only.
3. The UV lamp was allowed to warm up for 15 minutes, by turning on the UV curing station per protocol stated in F300S UV Lamp System.
4. At the drawdown station, the metal backing, with attached film coated substrate, was placed on the Elcometer station for applying the top coat.
5. A vacuum was applied, and the drawdown was placed appropriately on the metal surface, to allow for level even distribution of the top coat material. Three (3) small pipettes of top coat solution (1 ml) were applied across the top area (at the beginning of the draw down area). Another full pipette (1 ml) was ready for addition of extra top coat towards the end of the run.
6. The Elcometer was run at a speed of 4, and the run was stopped before the top coat reached the end of metal sheet.
7. Excess top coat was removed with paper towels, and the drawdown area was cleaned with acetone.
8. The film on the metal backing was then passed through the UV (400 mJ/cm²) curing station once, within 2-3 minutes of coating, at a speed of 30 ftpm.
9. After passing through the UV curing station, the substrate was placed in a hood for 15 minutes, to allow for sufficient drying at ambient conditions (23° C. and atmospheric pressure), and after which, the film was be removed from the metal backing and stored.

This process resulted in a "three-layered tile," i.e., a cured urethane-acrylate top coat (20), an adhesive primer layer (18) and a P/E wear layer substrate (16), as shown in FIG. 2.

Adhesion Testing

Crosshatch adhesion is a common industrial method for evaluating adhesion strength of the top coat to the primed substrate. A crosshatch adhesion test is performed on the "three-layered tile" (FIG. 2) using one tile sample per adhesion test. A crosshatch scribe is used to make parallel linear cuts through the surface coating. A similar set of linear cuts is made perpendicular to the original cuts in order to obtain a checker board pattern. The total number of individual squares is 100 per each test sample.

A tape (Scotch Tape 3M #810) is applied to the scribed surface, and the tape-covered area is rubbed with fingers in order to apply adequate pressure, ensuring intimate contact with the surface (approximate 50 g force). The top coated substrate test sample is allowed to sit for 10 to 30 seconds, and then the loose end of the tape is hand pulled, smoothly at an angle of about 135 degrees, to remove the tape from the surface. The coated surface is then visually evaluated for adhesion (ASTM D3359), and ranked using a numerical scaling to provide an indication of the adhesion strength (or the adhesion between the top coat and the primer).

Poor adhesion is observed when a majority of the scribed squares peel off with the tape. Excellent adhesion is observed when none (or few) of the scribed squares peel off with the tape. The adhesion is ranked from 0B to 5B. Zero (0B) being the worst case (>65% of the area of the scribed squares fail (or peeled off with the tape)), and 5B being the best (0% of the area of the scribed squares fail (peeled off with the tape)). The results are reported in Table 4. For each case where there was considerably lack of adhesion, an adhesive failure occurred between the primer—substrate (cast film) interface. Thus, the top coat, along with the primer layer was removed from the substrate, and the substrate remained in tack. Thus, the coating weight of the primer layer had no bearing on the adhesion or lack thereof of the primer layer to the substrate.

TABLE 4

Results of Cross-hatch Adhesion Testing (same substrate-see Table 2)

| Components (wt %) | Control Unprimed PE1 substrate enhanced with silica | Comp. Ex. A HARDLEN F-2P primer | Comp. Ex. B ENGAGE 8842 primer | Comp. Ex. C AMPLIFY GR216 primer | Inv. Ex. 1 AMPLIFY GR216/ KRATON FG1901 primer |
|---|---|---|---|---|---|
| g/m² coating weight (no solvent) of primer onto substrate | — | 3.8 | 5.4 | 1.7 | 10.7 |
| No. of squares removed by the tape | 100 | 0 | 92 | 87 | 0 |
| ASTM D3359 Classification [1] | 0B | 5B | 0B | 0B | 5B |
| Estimated Amt. of chlorine in the coating weight of primer layer | NA | 0.77 g/m² | NA | NA | NA |

[1] 5B: 0% area of the scribed squares fail;
4B: greater than zero and less, or equal to, 5% area of the scribed squares fail;
3B: greater than 5% to less than, or equal to, 15% area of the scribed squares fail;
2B: greater than 15% to less than, or equal to, 35% area of the scribed squares fail;
1B: greater than 35% to less than, or equal to, 65% area of the scribed squares fail;
0B: greater 65% area of the scribed squares fail.

It has been discovered that the inventive tile has excellent adhesion, and can be used as a chlorine-free, polyolefin-base tile to replace conventional vinyl tiles. As seen in Table 4, the Inventive Example 1 primed substrate showed better adhesion than the unprimed substrate (Control) and the substrates primed with ENGAGE 8842 ethylene/octene copolymer primer (Comp. Ex. B) and AMPLIFY GR 216 MAH-grafted ethylene/octene random copolymer primer (Comp. Ex. C). The Inventive Example 1 has comparable adhesion to Comparative Example A. However, this comparative example contains chlorine in its primer layer, which is not desirable, due to environmental hazards.

We claim:

1. A tile comprising:
    A) a first film formed from a first composition comprising the following:
        i) a functionalized olefin-based polymer comprising one or more chemical groups selected from the following: a) a carboxylic acid, and/or b) an anhydride, and, optionally, c) an amino or an amine; and
        ii) a functionalized styrenic block copolymer, comprising, in polymerized form, styrene, and ethylene and/or at least one alpha-olefin, and comprising one or more chemical groups selected from the following: a) a carboxylic acid, and/or b) an anhydride; and
    B) a substrate comprising at least one layer formed from a second composition comprising a propylene-based polymer;
    C) a UV-curable urethane-acrylate top coat layer applied onto and in contact with the first film; and
    wherein the first film covers at least one surface of the substrate.

2. The tile of claim 1, wherein the first composition comprises less than 0.001 wt % of an isocyanate compound, based on the weight of the first composition.

3. The tile of claim 1, wherein the first composition is halogen free.

4. An article comprising the tile of claim 1.

5. The tile of claim 1, wherein the functionalized olefin-based polymer is a functionalized ethylene-based polymer.

6. The tile of claim 1, wherein the functionalized olefin-based polymer is a functionalized ethylene/α-olefin interpolymer, selected from the group consisting of the following: an anhydride-functionalized ethylene/α-olefin interpolymer, a carboxylic-acid-functionalized ethylene/α-olefin copolymer, an hydroxy-functionalized ethylene/α-olefin copolymer, an amine-functionalized ethylene/α-olefin copolymer, and a combination thereof.

7. The tile of claim 1, wherein the functionalized styrenic block copolymer is selected from the group consisting of the following: an anhydride-functionalized styrenic block copolymer, a carboxylic-acid-functionalized styrenic block copolymer, an hydroxy-functionalized styrenic block copolymer, an amine-functionalized styrenic block copolymer, and a combination thereof.

8. The tile of claim 1, wherein the weight ratio of the functionalized olefin-based polymer to the functionalized styrenic block copolymer is from 2.0/1.0 to 6.0/1.0.

* * * * *